US008701078B1

(12) United States Patent
Holler et al.

(10) Patent No.: US 8,701,078 B1
(45) Date of Patent: Apr. 15, 2014

(54) CUSTOMIZED SETTINGS FOR VIEWING AND EDITING ASSETS IN AGILE SOFTWARE DEVELOPMENT

(75) Inventors: Robert Holler, Cumming, GA (US); Mark Crowe, Kula, HI (US); Rajiv Delwadia, Woodstock, GA (US); Dan Gilkerson, San Diego, CA (US); Pavel Mamut, Buford, GA (US); Donald Hanson, Cumming, GA (US)

(73) Assignee: Versionone, Inc., Alpharetta, GA (US)

( * ) Notice: Subject to any disclaimer, the term of this patent is extended or adjusted under 35 U.S.C. 154(b) by 1013 days.

(21) Appl. No.: 12/245,566

(22) Filed: Oct. 3, 2008

Related U.S. Application Data

(60) Provisional application No. 60/979,344, filed on Oct. 11, 2007.

(51) Int. Cl.
*G06F 9/44* (2006.01)
*G06F 17/21* (2006.01)
*G06F 3/00* (2006.01)

(52) U.S. Cl.
USPC ............ 717/101; 717/105; 715/273; 715/762

(58) Field of Classification Search
None
See application file for complete search history.

(56) References Cited

U.S. PATENT DOCUMENTS

| | | | |
|---|---|---|---|
| 5,544,300 A | 8/1996 | Skarbo et al. | |
| 5,714,971 A | 2/1998 | Shalit et al. | |
| 5,874,958 A | 2/1999 | Ludolph | |
| 5,943,053 A | 8/1999 | Ludolph et al. | |
| 5,956,030 A | 9/1999 | Conrad et al. | |
| 6,175,364 B1 | 1/2001 | Wong et al. | |
| 6,239,798 B1 | 5/2001 | Ludolph et al. | |
| 6,698,013 B1* | 2/2004 | Bertero et al. | 717/101 |
| 6,850,255 B2 | 2/2005 | Muschetto | |
| 7,051,038 B1* | 5/2006 | Yeh et al. | 707/603 |
| 7,117,447 B2* | 10/2006 | Cobb et al. | 715/762 |
| 7,210,093 B1 | 4/2007 | Dutta | |
| 7,272,815 B1 | 9/2007 | Eldridge et al. | |
| 7,376,891 B2 | 5/2008 | Hitchock et al. | |
| 7,415,677 B2 | 8/2008 | Arend et al. | |
| 7,490,314 B2 | 2/2009 | Yuknewicz et al. | |
| 7,640,496 B1* | 12/2009 | Chaulk et al. | 715/243 |
| 7,644,390 B2 | 1/2010 | Khodabandehloo et al. | |
| 7,930,201 B1 | 4/2011 | Issa et al. | |
| 8,370,803 B1* | 2/2013 | Holler et al. | 717/101 |

(Continued)

OTHER PUBLICATIONS

William Ribarsky et al., Glyphmaker Creating Customized Visualizations of Complex Data, 1994 IEEE, pp. 57-64, <http://ieeexplore.ieee.org/stamp/stamp.jsp?tp=&arnumber=299412>.*

(Continued)

*Primary Examiner* — Thuy Dao
*Assistant Examiner* — Cuong V Luu
(74) *Attorney, Agent, or Firm* — Morgan, Lewis & Bockius LLP

(57) ABSTRACT

A method of managing agile software development includes displaying a group of assets associated with an agile software development process. The group has a particular type and the assets include a first set of attributes selected for display. In response to detecting a request by a first user, a group of available attributes is displayed including the first set. De-selection of an attribute from the first set is detected. For other users accessing respective groups of assets of the particular type, the first set of attributes is displayed for assets in the respective groups, wherein the first set does not include the deselected attribute.

20 Claims, 12 Drawing Sheets

(56) References Cited

U.S. PATENT DOCUMENTS

| | | | |
|---|---|---|---|
| 2002/0062367 A1 | 5/2002 | Debber et al. | |
| 2002/0089526 A1 | 7/2002 | Buxton et al. | |
| 2002/0091732 A1 | 7/2002 | Pedro | |
| 2003/0033589 A1* | 2/2003 | Reyna et al. | 717/109 |
| 2003/0046282 A1 | 3/2003 | Carlson et al. | |
| 2003/0061330 A1 | 3/2003 | Frisco et al. | |
| 2003/0103079 A1 | 6/2003 | Adatia et al. | |
| 2003/0158845 A1 | 8/2003 | Braley | |
| 2003/0160815 A1 | 8/2003 | Muschetto | |
| 2003/0163404 A1 | 8/2003 | Hu et al. | |
| 2003/0172020 A1 | 9/2003 | Davies et al. | |
| 2003/0182470 A1 | 9/2003 | Carlson et al. | |
| 2003/0182652 A1 | 9/2003 | Custodio | |
| 2003/0188290 A1 | 10/2003 | Corral | |
| 2003/0204644 A1 | 10/2003 | Vincent | |
| 2004/0081951 A1 | 4/2004 | Vigue et al. | |
| 2004/0186762 A1 | 9/2004 | Beaven et al. | |
| 2004/0243457 A1 | 12/2004 | D'Andrea et al. | |
| 2004/0243968 A1 | 12/2004 | Hecksel | |
| 2004/0268246 A1 | 12/2004 | Leban et al. | |
| 2005/0004825 A1 | 1/2005 | Ehrler et al. | |
| 2005/0065951 A1 | 3/2005 | Liston et al. | |
| 2005/0086239 A1 | 4/2005 | Swann et al. | |
| 2005/0086638 A1* | 4/2005 | Farn | 717/105 |
| 2005/0114829 A1* | 5/2005 | Robin et al. | 717/101 |
| 2005/0114830 A1 | 5/2005 | Knutson et al. | |
| 2005/0132048 A1 | 6/2005 | Kogan et al. | |
| 2005/0198615 A1 | 9/2005 | Choi et al. | |
| 2005/0216879 A1 | 9/2005 | Ruhe | |
| 2005/0229157 A1* | 10/2005 | Johnson | 717/114 |
| 2006/0069604 A1 | 3/2006 | Leukart et al. | |
| 2006/0123389 A1 | 6/2006 | Kolawa et al. | |
| 2006/0212327 A1 | 9/2006 | Norman | |
| 2006/0235771 A1 | 10/2006 | Oberoi | |
| 2006/0236261 A1 | 10/2006 | Forstall et al. | |
| 2007/0033567 A1 | 2/2007 | Carlson et al. | |
| 2007/0094609 A1* | 4/2007 | Gilboa et al. | 715/762 |
| 2007/0124682 A1 | 5/2007 | Fukeda et al. | |
| 2007/0168918 A1* | 7/2007 | Metherall et al. | 717/101 |
| 2007/0288292 A1 | 12/2007 | Gauger | |
| 2008/0077416 A1 | 3/2008 | Hetrick | |
| 2008/0077530 A1 | 3/2008 | Banas et al. | |
| 2008/0097734 A1 | 4/2008 | Raffo | |
| 2008/0154749 A1 | 6/2008 | D'hooghe et al. | |
| 2008/0172625 A1 | 7/2008 | Montgomery | |
| 2008/0282228 A1 | 11/2008 | Subramanyam | |
| 2008/0301296 A1 | 12/2008 | York | |
| 2009/0024647 A1 | 1/2009 | Hein | |
| 2009/0204465 A1 | 8/2009 | Pradhan | |
| 2009/0271760 A1 | 10/2009 | Ellinger | |
| 2009/0300580 A1 | 12/2009 | Heyhoe et al. | |
| 2010/0088664 A1 | 4/2010 | Khodabandehloo et al. | |
| 2010/0218092 A1* | 8/2010 | Xiang et al. | 715/273 |
| 2010/0306730 A9 | 12/2010 | Carlson et al. | |

OTHER PUBLICATIONS

Elaine Chou, Redeigning a large and complex website how to begin and a method for success, 2002 ACM, pp. 22-28, <http://dl.acm.org/citation.cfm?id=588646.588652>.*

Doantam Phan et al., Progressive Multiples for Communication-Minded Visualization , 2007 ACM, pp. 225-232, <http://dl.acm.org/citation.cfm?id=1268517.1268554>.*

David R. Karger et al., Using URLs and Table Layout for web classification tasks, 2004 ACM, pp. 193-202, <http://dl.acm.org/citation.cfm?id=988672.988699>.*

Judith Ann Ouimet, SERT Software Tool for Generating Student Engagement Reports, 2007 IEEE, 8 pages, <http://ieeexplore.ieee.org/stamp/stamp.jsp?tp=&arnumber=4151762).*

Harry M.Sneed, Reengineering Reports, 2004 IEEE, 10 pages, <http://ieeexplore.ieee.org/stamp/stamp.jsp?tp=&arnumber=1374302>.*

Cause, G., "Delivering Real Business Value Using FDD," Methods and Tools, Winter 2004 (vol. 12—No. 4), pp. 23-35, http://www.methodsandtools.com/PDF/mt200404.pdf.

De Luca, J., "FDD Implementations," Nebulon Pty. Ltd., 10 pages, http://www.nebulon.com/articles/fdd/fddimplementations.html and http://web.archive.org/web/20051118103830/nebulon.com/articles/fdd/fddimplementations.html archived Nov. 2005.

Fowler, M., "The New Methodology," martinfowler.com Dec. 13, 2005, 19 pages, http://www.martinfowler.com/articles/newMethodology.html.

Danube Technologies, "ScrumWorks Quick Start Guide—Version 1.4.2," 10 pages, http://web.archive.org/web/20060117203359/danube.com/docs/scrumworks/latest/quickstart.html, archived Jan. 2006.

Danube Technologies, "ScrumWorks Web Client User Guide—Version 1.4.2," 7 pages, http://web.archive.org/web/20060117203638/danube.com/docs/scrumworks/latest/webuserguide.html, archived Jan. 2006.

VersionOne, "Frequently Asked Questions," © 2005 VersionOne, LLC, 4 pages.

VersionOne, "Simplifying Software Delivery," © 2006 VersionOne, LLC, 1 page.

VersionOne, "Simplify the Rollout of Agile Development within Your Organization," © 2007 VersionOne, LLC, 2 pages.

Barton, B. et al., "Reporting Scrum Project Progress to Executive Management through Metrics," Jan. 2005, 9 pages, http://www.spin-montreal.org/Downloads/Conférences/Saison_2006-2007/Reporting_Scrum_Progress.pdf.

Ceschi, M. et al., "Project Management in Plan-Based and Agile Companies," May/Jun. 2005, 7 pages, IEEE Software, 0740-7459/05.

Cruise Control, downloaded Apr. 9, 2010,1 page, http://cruisecontrol.sourceforge.net.

Cruise Control Overview, downloaded Apr. 9, 2010, 34 pages, http://cruisecontrol.sourceforge.net/overview.html.

Danube Technologies, ScrumWorks Pro—Documentation, Web Client User Guide, Feb. 2007, 7 pages.

De Luca, J., "Parking Lot Chart—Legend," Feature Driven Development, Mar. 16, 2007, 2 pages, http://www.featuredrivendevelopment.com/node/1037.

De Luca, J., "Parking Lot Chart Example 1, Feature Driven Development," http://www.featluredrivendevelopment.com/node/630, Dec. 17, 2003, 2 pages.

De Luca, J., "Parking Lot Chart Example 2," Nov. 20, 2003, 1 page, http://www.featured drivendevelopment.com/node/619.

De Luca, J., "Parking Lot Chart—Aesthetics," Mar. 16, 2007, 2 pages, http://www.featureddrivendevelopment.com/node/1038.

Derby, E., "Agile Retrospectives," The Pragmatic Bookshelf, 186 pages, Dec. 26, 2007.

IBM, Cognos Software, "Budgeting and Forecasting Software," Jun. 2, 2009, 3 pages, http://www.cognos.com/performance-management/software-planning-budgeting-forcasting.

JetBrains, "Distributed Build Management and Continuous Integration Server," Apr. 9, 2010, 3 pages, http://www.jetbrains.com/teamcity/features/index.html.

JetBrains, "Distsributed Build Management and Continuous Integrations Server: Features," Apr. 9, 2010, 2 pages, http://www.jetbrains.com/teamcity/features/index.html.

JetBrains, "TeamCity 3.0—Overview," Jun. 28, 2010, 10 pages, http://www.jetbrains.com/teamcity/documentation/TeamCity3-Overview.pdf.

JetBrains, "TeamCity 4.5," 2003-2009, 2 pages, http://www.jetbrains.com/teamcity/documentation/TeamCityData_Sheet.pdf.

Microsoft Office Online Demo: Base sales Forecasts and Trendlines on Data, Jun. 2, 2009, 3 pages, http://office.microsoft.com/en-us/excel/HA010929231033.aspx?mode=print.

Microsoft Office Online, Demo: Check That Hunch with Excel "What-If" Scenarios, Jun. 2, 2009, 1 page.

Microsoft Office Online, Show Trends and Forecast Sales with Charts, Jun. 2, 2009, 7 pages, http://office.microsoft.com/en-us/excel/HA010877851033.aspx?mode=print.

Microsoft Office Online, Understanding Scheduling in Microsoft Project 2002, Jun. 2, 2009, 7 pages, http://office.microsoft.com/en-us/project/HA010563061033.aspx?mode=print.

(56) References Cited

OTHER PUBLICATIONS

Mountain Goat Software, Training for Scrum Task Board Use, Apr. 8, 2010, 5 pages, http://www.mountaingoatsoftware.com/scrum/taskboards.
Netsuite Sales Forecasting Software—NetSuite SFA Software, Netsuite Inc., 1998-2009, 6 pages.
Sandler, D., "Source Control in Ten Minutes: a Subversion Tutorial," Jan. 24, 2006, 6 pages, http://www.owlnet.rice.edu/~comp314/svn.html.
Screenshots of Xplanner, May 10, 2005, 1 page.
Sugarcrm, Sugarsuite Screenshot, Apr. 8, 2010, 1 page, http://www.sugarcrm.com/crm/screenshot.php?i=/crm/images/content_images/screens/scree.
Vanguard Software, Forecasting Software, Jun. 2, 2009, 4 pages, http://www.vanguardsw.com/solutions/application/forecasting/default.htm?gclid=CLHZpPP.
VersionOne, Exhibit A and B, Figures 1 and 2, Oct. 19, 2006, 2 pages, http://www.versionone.com//product_planning.asp.
XPlanner How to Notes, May 10, 2005, 9 pages, http://www.xplanner.org.
Holler, Office Action, U.S. Appl. No. 12/247,963, Mar. 15, 2012, 20 pgs.
Odenwelder, Office Action, U.S. Appl. No. 12/463,299, Apr. 25, 2012, 18 pgs.
Holler, Office Action, U.S. Appl. No. 12/016,191, Jul. 19, 2012, 12 pgs.
Holler, Office Action, U.S. Appl. No. 12/016,192, Apr. 30, 2012, 12 pgs.
Holler, Office Action, U.S. Appl. No. 12/016,193, Jul. 9, 2012, 10 pgs.
Holler, Office Action, U.S. Appl. No. 12/101,089, May 23, 2012, 16 pgs.
Holler, Office Action, U.S. Appl. No. 12/247,939, Jun. 7, 2012, 9 pgs.
Holler, Office Action, U.S. Appl. No. 12/247,963, Jul. 9, 2012, 23 pgs.
Holler, Office Action, U.S. Appl. No. 12/357,225, Jul. 19, 2012, 29 pgs.
Holler, Office Action, U.S. Appl. No. 12/174,511, May 11, 2012, 21 pgs.
Holler, Notice of Allowance, U.S. Appl. No. 12/016,192, Sep. 28, 2012, 8 pgs.
Holler, Notice of Allowance, U.S. Appl. No. 12/247,963, Jan. 30, 2013, 8 pgs.
Holler, Office Action, U.S. Appl. No. 12/016,193, Jan. 30, 2013, 13 pgs.
Holler, Office Action, U.S. Appl. No. 12/174,511, Jan. 4, 2013, 23 pgs.
Holler, Office Action, U.S. Appl. No. 12/247,939, Nov. 19, 2012, 9 pgs.
Holler, Office Action, U.S. Appl. No. 12/357,225, Nov. 23, 2012, 30 pgs.
Odenwelder, Notice of Allowance, U.S. Appl. No. 12/463,299, Dec. 4, 2012, 13 pgs.
Holler, Office Action, U.S. Appl. No. 12/016,191, Jun. 19, 2013, 13 pgs.
Holler, Office Action, U.S. Appl. No. 12/101,089, Jun. 20, 2013, 13 pgs.
Holler, Office Action, U.S. Appl. No. 12/247,939, Apr. 26, 2013, 5 pgs.
Holler, Office Action, U.S. Appl. No. 12/101,084, Jun. 21, 2013, 14 pgs.

\* cited by examiner

File | Edit | View | Go | Bookmarks | Tools | Help  http://www.secure.v1host.com/

These customizations will apply to: System Defaults ▼ —258

Customize Columns

Display Column                Edit Description
☑ Icon
☑ Title 212
☑ ID 214
☑ Owner 216                   Workitem ID
☑ Status 218                  Owner or Owners ←—250
☑ Priority 220                ☑ ←—252
☑ Estimate 222 ——253          Approximation or judgment of the size of Stories and/or Defects
☐ Project 224                 Project hierarchy node the item is in
☐ Attachment Count 248        Number of Attachments defined
☐ Automate
☐ Build                       Build in which functionality is delivered
☐ Change Comment
☐ Change Date
☐ Changed By
☐ Child Tasks                 Tasks created through the breakdown function
☐ Customer
☐ Dependants                  Stories required to be able to complete this Story
☐ Dependencies                Stories that depend on this Story
☐ Dependency Icon
☐ Description
☐ Detail Estimate             Work Estimate – Story rollup with details for Defect, Task, Test rows; Story details if tracking at that level
☐ Found By

240 ↗
242 ↗
244 —
246 —

254
Apply | Cancel | Reset Defaults —256

Figure 2C

CUSTOMIZED SETTINGS FOR VIEWING AND EDITING ASSETS IN AGILE SOFTWARE DEVELOPMENT

RELATED APPLICATIONS

This application claims priority to U.S. Provisional Patent Application No. 60/979,344, titled "Customized Settings for Viewing and Editing Assets in Agile Software," filed Oct. 11, 2007, which is hereby incorporated by reference in its entirety.

TECHNICAL FIELD

The disclosed embodiments relate generally to managing agile software development, and more particularly, to providing customized defaults for viewing and editing assets associated with agile software development.

BACKGROUND

Agile software development refers to software development methodologies in which software is developed incrementally in steps referred to as iterations. Iterations typically are measured in weeks and may vary in length from one week or less to one month or more.

Examples of agile software development methodologies include Scrum, Extreme Programming (XP), Crystal, Lean Development, AgileUP, and Dynamic Systems Development Method (DSDM). Agile software development methods also have been referred to as lightweight methods. Methodologies may have their own vocabulary. For example, an iteration may be referred to as a sprint or a timebox, depending on the methodology. Agile software development is distinguishable from the "waterfall" model of sequential software development.

Software for implementing agile development methodologies and for tracking and reporting on projects that use agile methodologies can help developers to realize fully the benefits, such as flexibility and rapid cycle times, offered by these methodologies. Accordingly, there is a need for robust agile development management software that is convenient to use.

SUMMARY

A method of managing agile software development includes displaying a group of assets associated with an agile software development process. The group has a particular type and the assets include a first set of attributes selected for display. In response to detecting a request by a first user, a group of available attributes is displayed, including the first set. De-selection of an attribute from the first set is detected. For other users accessing respective groups of assets of the particular type, the first set of attributes for assets in the respective groups is displayed, wherein the first set does not include the deselected attribute.

A system for managing agile software development includes memory, a display, one or more processors, and one or more programs stored in the memory and configured for execution by the one or more processors. The one or more programs include instructions to display a group of assets associated with an agile software development process. The group has a particular type and the assets include a first set of attributes selected for display. The one or more programs also include instructions to display a group of available attributes including the first set, in response to detecting a request by a first user; instructions to detect de-selection of an attribute from the first set; and instructions to display, to other users accessing respective groups of assets of the particular type, the first set of attributes for assets in the respective groups, wherein the first set does not include the deselected attribute.

A computer readable storage medium stores one or more programs for use in managing agile software development. The one or more programs include instructions to display a group of assets associated with an agile software development process. The group has a particular type and the assets include a first set of attributes selected for display. The one or more programs also include instructions to display a group of available attributes including the first set, in response to detecting a request by a first user; instructions to detect de-selection of an attribute from the first set; and instructions to display, to other users accessing respective groups of assets of the particular type, the first set of attributes for assets in the respective groups, wherein the first set does not include the deselected attribute.

A system for managing agile software development includes memory, a display, and one or more processors. The system also includes means for displaying a group of assets associated with an agile software development process. The group has a particular type and the assets include a first set of attributes selected for display. The system further includes means for displaying a group of available attributes including the first set, in response to detecting a request by a first user; means for detecting de-selection of an attribute from the first set; and means for displaying, to other users accessing respective groups of assets of the particular type, the first set of attributes for assets in the respective groups, wherein the first set does not include the deselected attribute.

A method of managing agile software development includes displaying a group of assets associated with an agile software development process. The group has a particular type and the assets include a set of attributes selected for display. User input fields to edit attributes in a first subset of the set of attributes are displayed. De-selection of an attribute from the first subset by a first user is detected. For other users accessing respective groups of assets of the particular type, user input fields to edit the attributes in the first subset are displayed, wherein the first subset does not include the deselected attribute.

A system for managing agile software development includes memory, a display, one or more processors, and one or more programs stored in the memory and configured for execution by the one or more processors. The one or more programs include instructions to display a group of assets associated with an agile software development process. The group has a particular type and the assets include a set of attributes selected for display. The one or more programs also include instructions to display user input fields to edit attributes in a first subset of the set of attributes; instructions to detect de-selection of an attribute from the subset; and instructions to display, to other users accessing respective groups of assets of the particular type, user input fields to edit the attributes in the subset, wherein the subset does not include the deselected attribute.

A computer readable storage medium stores one or more programs for use in managing agile software development. The one or more programs include instructions to display a group of assets associated with an agile software development process. The group has a particular type and the assets include a set of attributes selected for display. The one or more programs also include instructions to display user input fields to edit attributes in a first subset of the set of attributes; instructions to detect de-selection of an attribute from the subset; and instructions to display, to other users accessing respective groups of assets of the particular type, user input fields to edit the attributes in the subset, wherein the subset does not include the deselected attribute.

A system for managing agile software development includes memory, a display, and one or more processors. The system also includes means for displaying a group of assets associated with an agile software development process. The group has a particular type and the assets include a set of attributes selected for display. The system further includes means for displaying user input fields to edit attributes in a first subset of the set of attributes; means for detecting deselection of an attribute from the subset; and means for displaying, to other users accessing respective groups of assets of the particular type, user input fields to edit the attributes in the subset, wherein the subset does not include the deselected attribute.

BRIEF DESCRIPTION OF THE DRAWINGS

FIGS. 2B and 2C are schematic screenshots of a customization user interface displaying available attributes associates with assets in accordance with some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
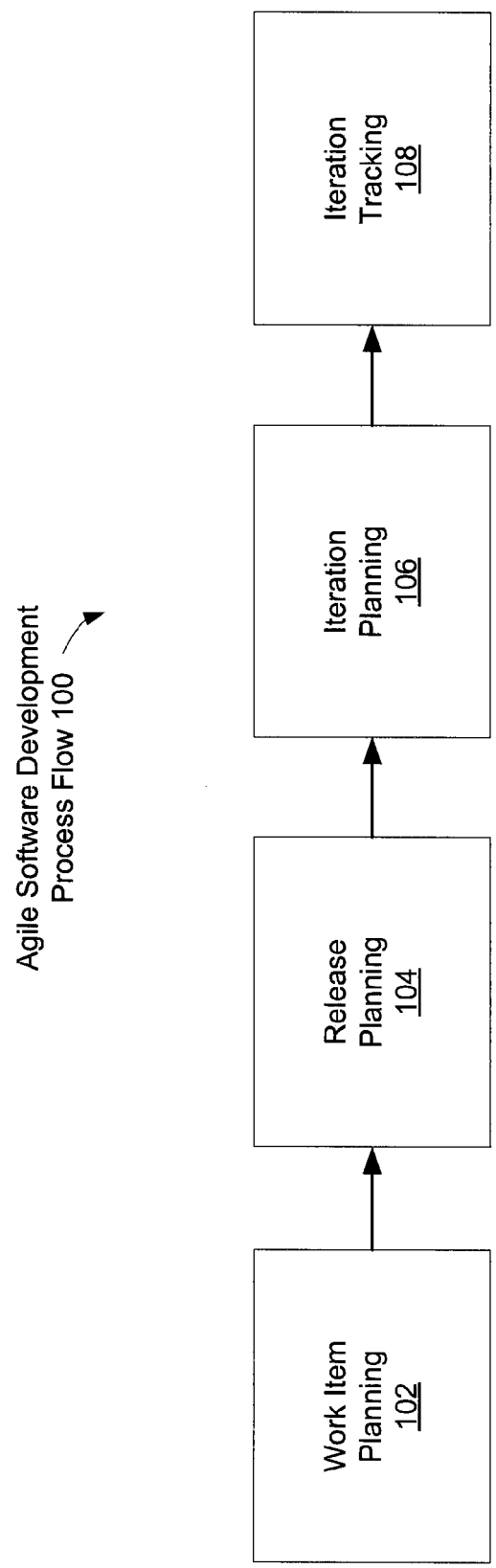
FIG. 1 is a flow diagram illustrating an agile software development process flow 100 in accordance with some embodiments.

FIG. 1 is a flow diagram illustrating an agile software development process flow 100 in accordance with some embodiments. Support for performing operations in the process flow 100 can be provided by agile development management software.

Work item planning (102) includes identifying work to be performed during the software development process. For examples, features to be included in the software being developed are specified and software defects to be fixed during development are identified. Depending on the agile methodology being used, features also may be referred to as stories, backlog items, or requirements. In general, a work item is any item for which the agile development management software platform can track and record effort, such as time spent working on the item.

Release planning (104) includes assigning identified work items (e.g., features and defects) to particular planned software releases. For example, certain features may be included in an initial release, with additional features to be added in subsequent releases. Similarly, fixing various defects may be scheduled across multiple releases. More generally, release planning may include assigning identified work items to levels or nodes in a project hierarchy. The project hierarchy may include projects, sub-projects, releases, teams and other internal organizations, clients or customers, and vendors.

Iteration planning (106) includes assigning work items to iterations. There may be multiple iterations performed to prepare a particular software release; iteration planning thus involves specifying what work will be performed in which iterations. For example, features and defects are assigned to particular iterations. Within each iteration, tasks and tests corresponding to the features and defects are defined. A task is a unit of work performed as part of delivering a feature. In some embodiments, a task is defined such that it takes no more than 3 days to perform. A test is an acceptance criterion that a feature must satisfy. Work estimates for the time required to complete tests and tasks may be entered.

The actual time spent working on the work items (e.g., on the features and defects and their corresponding tasks and tests) during an iteration is tracked (108) and compared against the estimates. Progress and status reports may be displayed graphically. For example, a "dashboard" user interface may display multiple graphical reports. Possible graphical reports include burndown charts, velocity charts, burn-up charts, Gantt charts, scope change, defect trending, test case status, and defect actuals. A burndown chart illustrates remaining work vs. time. Velocity refers to the work done per iteration on a project. Scope change refers to a change in requirements, such as the addition or deletion of features and defects. Reports may be generated for a specified level or node in the project hierarchy.

The operations in the development process flow 100 are presented sequentially in FIG. 1 for purposes of illustration. However, the operations need not be performed sequentially. For example, the planning operations 102, 104, and 106 may be updated dynamically throughout the agile development process. Similarly, tracking 108 may be performed dynamically, and may prompt subsequent planning changes. Furthermore, multiple operations may be combined into a single operation and additional operations may be added to the flow 100.

At a high level, the agile software development process has various assets associated with it. Nodes in the project hierarchy, such as projects, sub-projects, releases, teams, clients, and vendors, can be considered assets, as can iterations. Work items such as features and defects are assets, as are tasks and tests. Assets may be associated with other assets: for example, tasks and tests are associated with corresponding features and defects, which in turn are associated with corresponding iterations.

An asset includes various attributes. In some embodiments, each kind of asset (e.g., project, feature, task, etc.) has a specified set of associated attributes. Types of attributes include text strings, numerical values, values calculated according to a formula ("synthetic attributes"), and associated assets. A first asset associated with a second asset thus is considered an attribute of the second asset. An attribute may be automatically included (e.g., hard-coded or created for a particular installation) in agile development management software or may be customized (i.e., user-defined).

Agile development management software can display groups of assets of a particular type. For example, groups of assets associated with work item planning, release planning, or iteration planning may be displayed. In some embodiments, the groups of assets are displayed in a user interface shown in a browser window. In other embodiments, the user interface is shown by a stand-alone application.

Figure 2A:
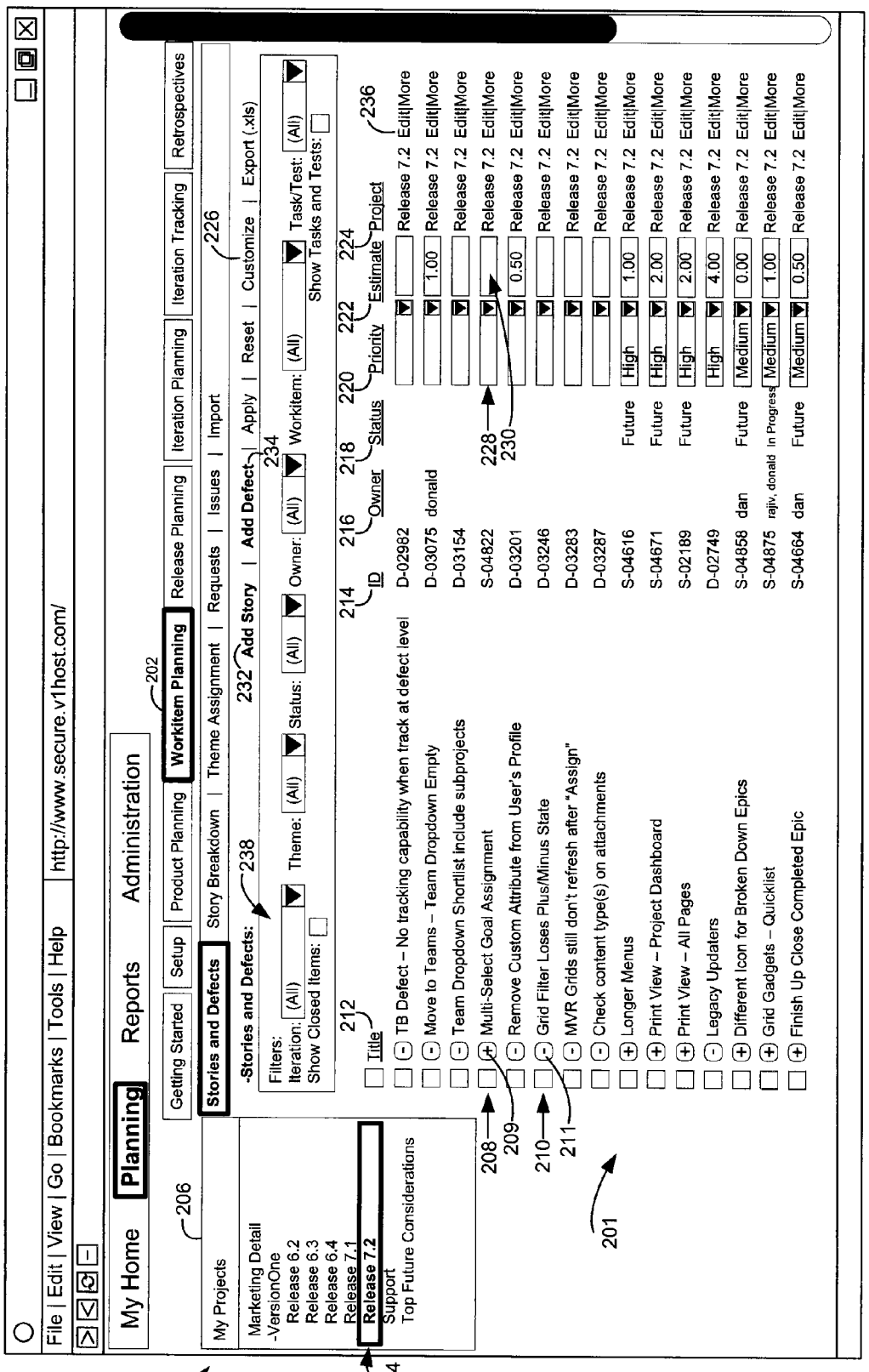
FIGS. 2A and 2D are schematic screenshots of a user interface displaying assets associated with an agile software development process in accordance with some embodiments.

FIG. 2A is a schematic screenshot of a user interface 200 displaying a group 201 of assets associated with an agile software development process, in accordance with some embodiments. In some embodiments, the particular type of group is determined by selecting a tab, selection box, radio button icon, or item in a drop-down menu. For example, in FIG. 2A a "workitem planning" tab 202 has been selected, indicating that the group 201 is a work item planning group. A group of a particular type may include multiple kinds of assets. For example, the work item planning group 201 includes features (e.g., "Multi-Select Goal Assignment" 208) and defects (e.g., "Grid Filter Loses Plus/Minus State" 210), as indicated by features icons 209 and defects icons 211.

The displayed assets in the group 201 are associated with a particular project hierarchy node 204, displayed for example in a project selection window 206.

Assets may be added to the group 201, for example, by selecting an "add story" (i.e., add feature) link 232 or an "add defect" link 234. In general, a user interface for displaying a group of assets may include multiple links or icons for adding multiple respective kinds of assets, or may include a single link or icon for adding assets. In some embodiments, selection of a link or icon for adding assets results in the display of a separate user interface for adding assets (not shown).

Assets displayed in the group 201 also may be edited, for example, by selecting an "edit" link (e.g., 236) corresponding to a respective asset. In some embodiments, selection of an edit link or corresponding icon results in the display of a separate user interface for editing assets (not shown).

The displayed assets include a set of attributes selected for display, such as title 212, ID 214, owner 216, status 218, priority 220, estimate 222, and project 224. Some of the attributes are also assets, such as project 224. Some of the values for the attributes are blank: for example, no owner 216, status 218, priority 220, or estimate 222 is shown for a number of assets, including feature 208.

Assets to be displayed in the group 201 may be filtered according to one or more attributes using filters 238.

A subset of the displayed attributes includes user input fields to accept edits to attribute values. For example, a user may select a priority from a drop-down box 228 and may enter a work estimate (e.g., an estimate of required time) in a text input box 230.

Figure 2B:
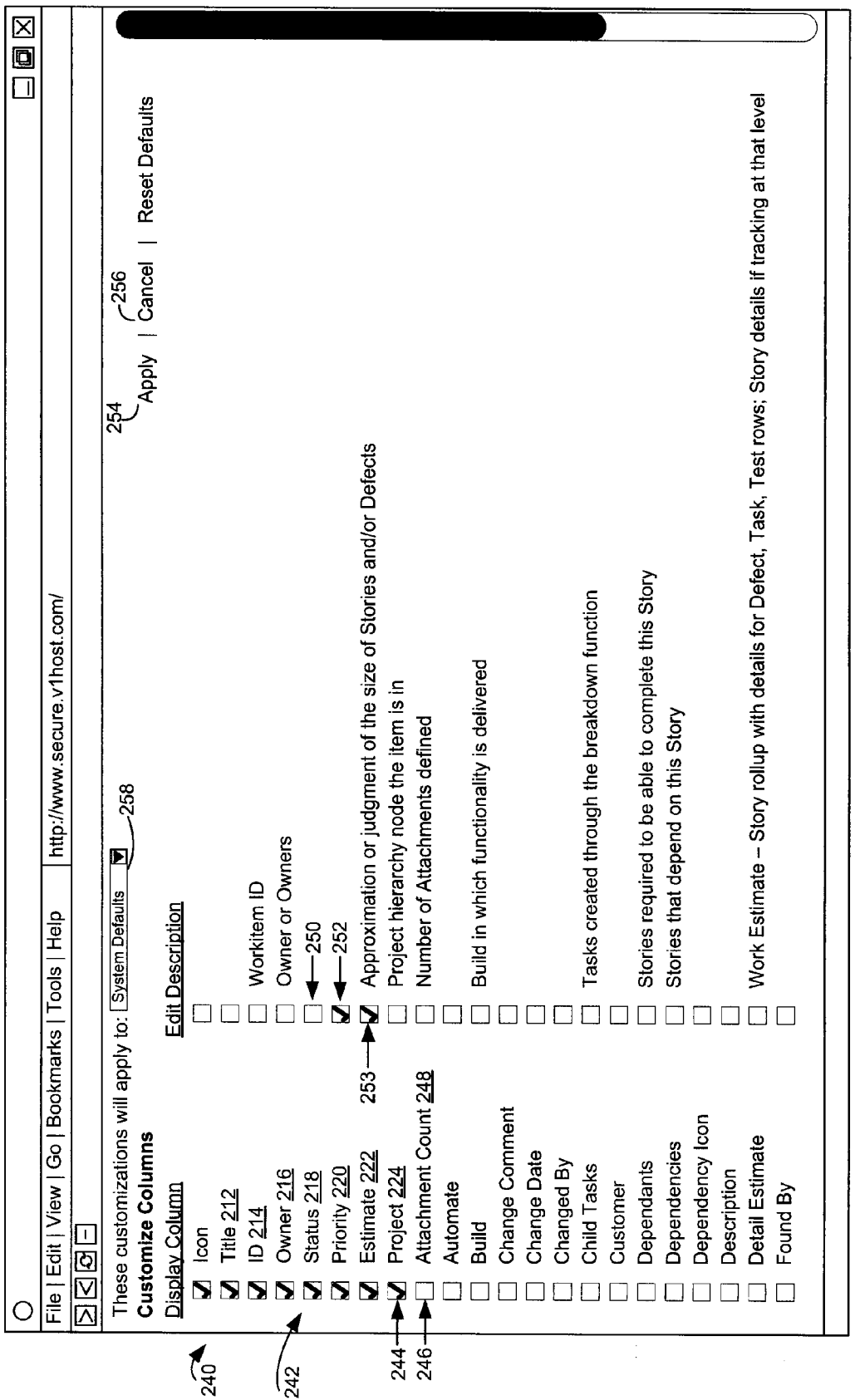

Upon detecting user selection of a customization link or icon, such as "customize" link 226, a customization user interface 240 is displayed that shows a group of available attributes 242, as illustrated in FIG. 2B in accordance with some embodiments. In the example of FIG. 2B, the group 242 is shown as a list. The available attributes include the set of attributes selected for display and may include additional attributes that are not currently selected for display. In some embodiments, the group of available attributes may be viewed directly from the user interface 200, for example via a drop-down menu, instead of through the customization user interface 240.

The customization user interface 240 allows a user to select or de-select attributes for display. "Display selection boxes" (e.g., 244 and 246) associated with respective attributes (e.g., "project" 224 and "attachment count" 248) indicate which attributes are currently selected for display. For example, the checked display selection boxes in FIG. 2B correspond to the set of attributes displayed for the group 201 of assets in user interface 200 (FIG. 2A). The user may select an attribute (i.e., add the attribute to the set selected for display) or de-select an attribute (i.e., remove the attribute from the set selected for display) by clicking on the corresponding display selection box (e.g., with a mouse or other selection device). For example, clicking on display selection box 244 deselects the "project" attribute 224, as illustrated in FIG. 2C. Similarly, clicking on display selection box 246 selects the "attachment count" attribute 248 for display. Alternate means of selecting and deselecting attributes are possible, such as clicking on a radio button associated with the attribute or clicking on the attribute itself.

Figure 2D:
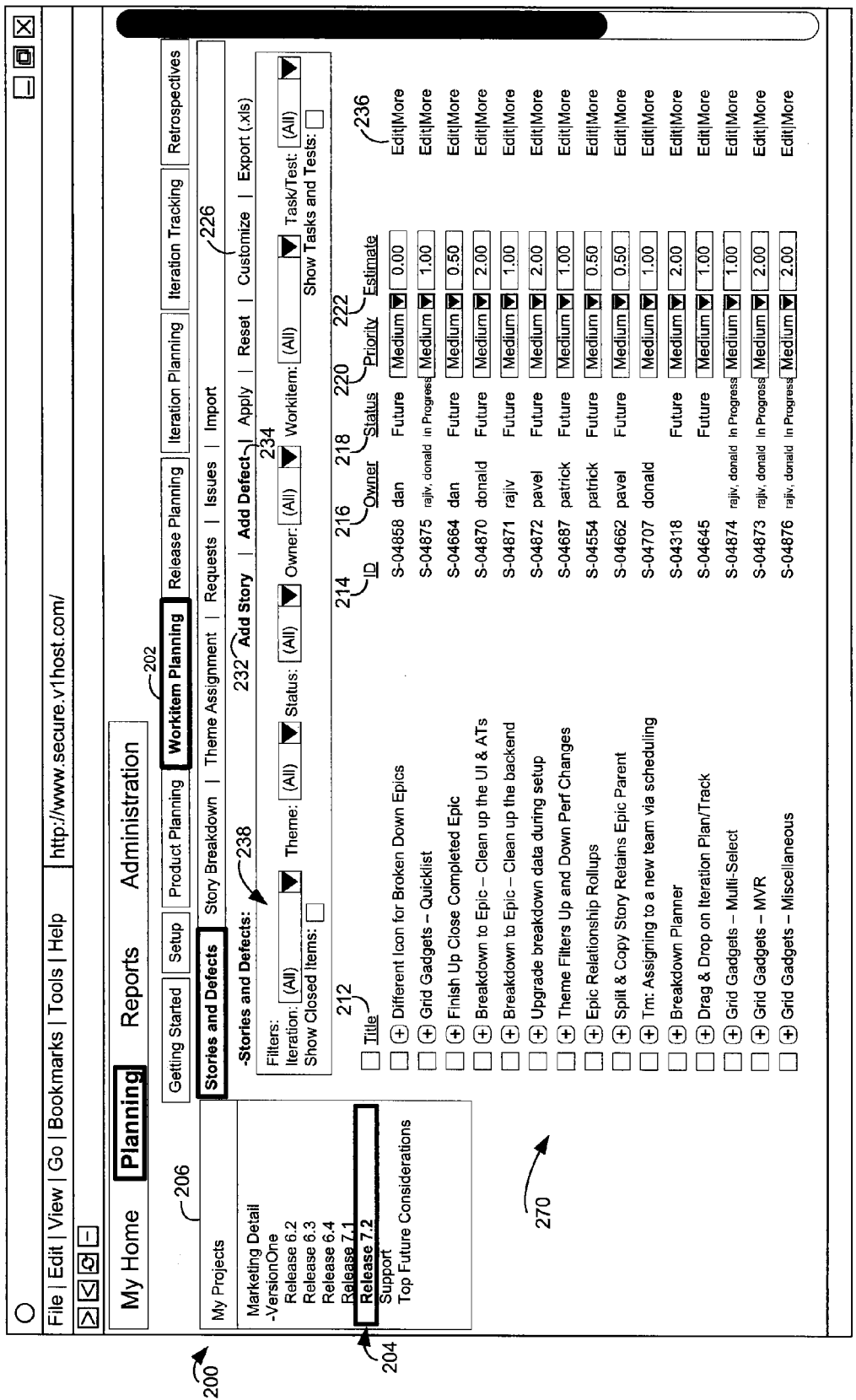

Changes to the set of selected attributes may be applied by selecting an "apply" icon 254 or may be canceled by selecting a "cancel" icon 256. Once the changes have been applied, the updated set of selected attributes is included in displays of groups of assets of the same type as the group 201. For example, when a "work item planning" group 270 is displayed subsequent to de-selection of the "project" attribute 224, the "project" attribute 224 is not included in the display, as illustrated in FIG. 2D in accordance with some embodiments. If the "attachment count" attribute 248 had been selected, the "attachment count" attribute would be included in subsequent display of the group 270.

The customization user interface 240 also allows a user to specify whether to permit particular attributes to be edited. "Editing selection boxes" (e.g., 250 and 252) associated with respective attributes (e.g., "status" 218 and "priority" 220) indicate which attributes are in the subset to be displayed with user input fields. For example, the checked editing selection boxes 252 and 253 in FIG. 2B correspond to the subset of attributes (i.e., attributes 220 and 222) with user input fields in user interface 200 (FIG. 2A). The user may select an attribute for editing (i.e., add the attribute to the subset) or de-select an attribute for editing (i.e., remove the attribute from the subset) by clicking on the corresponding editing selection box (e.g., with a mouse or other selection device). In the example of FIGS. 2B and 2C, adding "status" 218 to the subset (e.g., by clicking on box 250) would cause subsequently displayed work item planning groups to include user input fields for the "status" attribute 218. Removing "priority" 220 from the subset (e.g., by clicking on box 252) would cause subsequently displayed work item planning groups not to include user input fields for the "priority" attribute 220.

Customized settings entered in the user interface 240 regarding the display of attributes and the ability to edit attributes may apply only to a particular user or may apply to multiple users. For example, a customized setting may be created as a system default for all users viewing a particular type of group of assets (e.g., a work item planning group, a release planning group, or an iteration planning group). In some embodiments, a user must have particular privileges, such as system administrator privileges, to create a system default customized setting. More generally, customized settings may be created that serve as a default for all users at or below a particular node in the project hierarchy. For example, a customized setting may serve as a default for all users on a particular team or on a group of teams, or for all users working on a particular project, sub-project, or release. In some embodiments, a user creating a particular default setting must have appropriate corresponding privileges. For example, authority to create a customized default for a particular team could be limited to the team leader.

In the user interface 240, the level of application of the customized setting is specified using a drop-down menu 258. The "system defaults" level shown as selected in the drop-down menu 258 indicates that the customized setting applies to all users viewing groups of the corresponding type. In some embodiments, the "system defaults" option will not be displayed in the drop-down menu 258 unless the user has already logged as a system administrator or with other appropriate privileges.

In some embodiments, a user can override a default customized setting (e.g., a system default) by creating a user-specific customized setting, also known as a personalized setting. For example, the user may use the drop-down menu 258 to specify that a customized setting created via user interface 240 is specific to that user. This personalized setting then will control the display and ability to edit attributes associated assets in a group of a particular type. If a user does not have a personalized setting, the default customized setting will control the display and ability to edit attributes associated with the group. In some embodiments, a system administrator or other user with appropriate privileges may specify, for a particular default customized setting, whether individual users are permitted to override the default. In some embodiments, individual users are permitted to override the default with regard to attributes to be displayed, but not with regard to attributes to be edited.

Figure 3A:
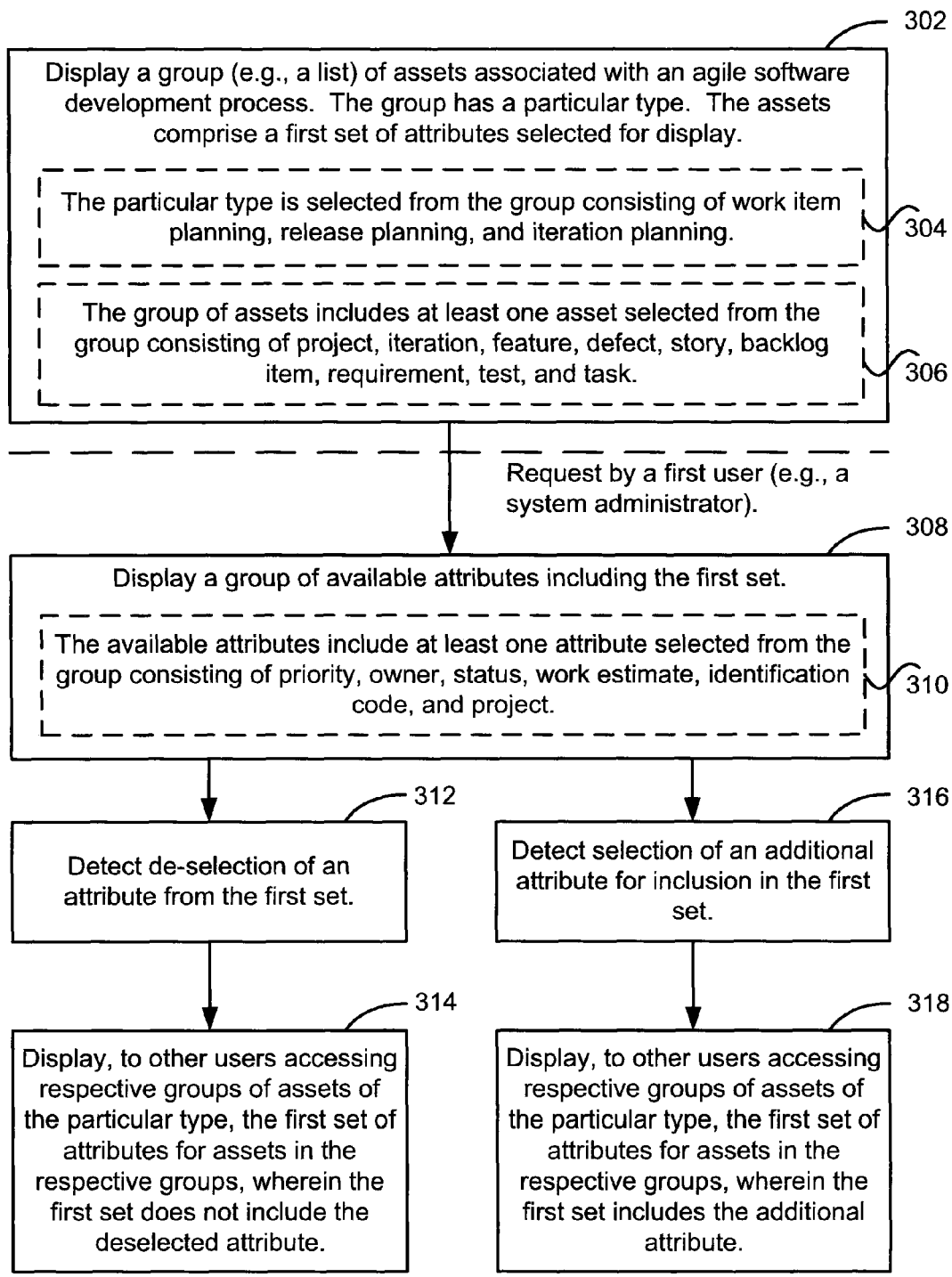
FIGS. 3A-3D are flow diagrams illustrating processes for managing agile software development in accordance with some embodiments.

FIG. 3A is a flow diagram illustrating a method 300 for managing agile software development in accordance with some embodiments. In the method 300, a group of assets associated with an agile software development process is displayed (302). The group has a particular type and the assets include a first set of attributes selected for display. For example, the first set of attributes for the assets displayed in user interface 200 (FIG. 2A) includes attributes 212, 214, 216, 218, 220, 222, and 224.

In some embodiments, the particular type is selected from the group consisting of work item planning, release planning, and iteration planning (304). A user may select the particular type by, for example, selecting a tab (e.g., "work item planning" tab 202, FIG. 2A), selecting a type from a drop-down menu, or using similar well-known methods of selection for graphical user interfaces.

In some embodiments, the group of assets includes at least one asset selected from the group consisting of project, iteration, feature, defect, story, backlog item, requirement, test, and task (306). For example, the group may include one or more features and one or more defects, as shown for group 201 (FIG. 2A).

In some embodiments, the group of assets is a list, as shown for group 201 (FIG. 2A).

A request by a first user is detected. In some embodiments, the first user is a system administrator or other user with privileges to create a customized default setting. In response to detecting the request by the first user, a group of available attributes is displayed (308), including the first set. In some embodiments, the available attributes include at least one attribute selected from the group consisting of priority, owner, status, work estimate, identification code, and project (310). For example, the customization user interface 240 shows a group of available attributes 242 (FIG. 2B). In the customization user interface 240, assets in the first set are indicated by check marks in corresponding display selection boxes (e.g., 244).

De-selection of an attribute from the first set is detected (312). For example, clicking on the display selection box 244 for the "project" attribute 224 in the customization user interface 240 results in de-selection of the "project" attribute 224 from the first set, as illustrated in FIG. 2C.

For other users subsequently accessing respective groups of assets of the particular type, the first set of attributes is displayed (314) for assets in the respective groups, wherein the first set does not include the deselected attribute. For example, after de-selection of the "project" attribute 224, a user accessing a "work item planning" group 270 (FIG. 2D) will not be shown the "project" attribute.

In addition to or instead of detecting de-selection of an attribute from the first set, selection of an additional attribute for inclusion in the first set is detected (316). For exampling, clicking on the display selection box 246 for the "attachment count" attribute 248 (FIG. 2B) results in selection of the "attachment count" attribute 248 for inclusion in the first set.

For other users subsequently accessing respective groups of assets of the particular type, the first set of attributes is displayed (318) for assets in the respective groups, wherein the first set includes the additional attribute. For example, after selection of the "attachment count" attribute 248, a user accessing a "work item planning" group will be shown the "attachment count" attribute.

The method 300 thus enables creation of default customized settings, such as system defaults, for viewing groups of assets. While the method 300 includes a number of operations that appear to occur in a specific order, it should be apparent that the method 300 can include more or fewer operations, which can be executed serially or in parallel. An order of two or more operations may be changed and two or more operations may be combined into a single operation. For example, while operations 312-314 and 316-318 are shown as occurring in parallel, either operations 312-314 or 316-318 may be omitted. Alternately, operations 312 and 316 may both be performed prior to operations 314 and 318, which subsequently are performed in a single operation. Other variations are possible.

Figure 3B:
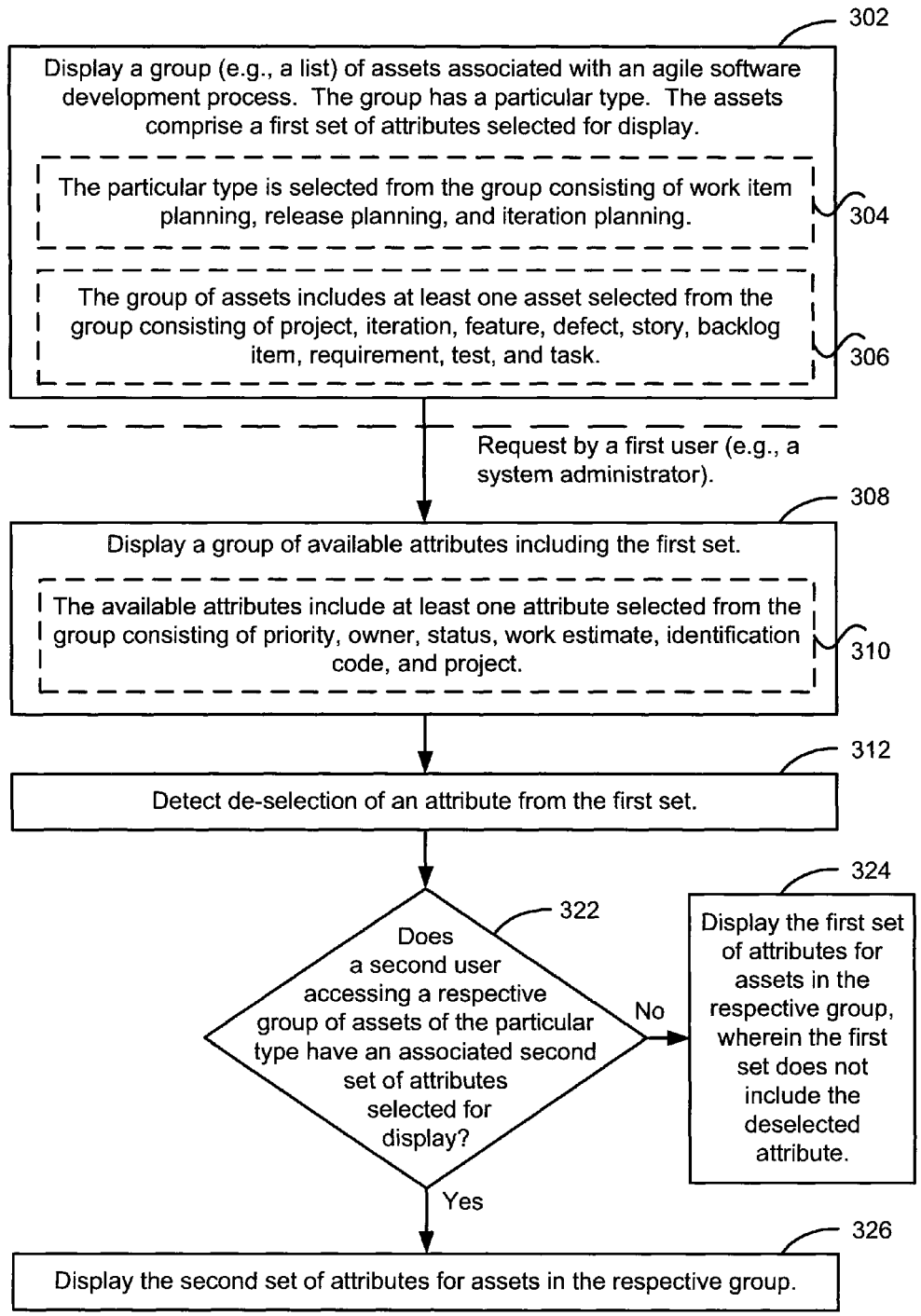

FIG. 3B is a flow diagram illustrating a method 320 for managing agile software development in accordance with some embodiments. In the method 320, operations 302-312 are performed as described above for method 300.

When a second user accesses a respective group of assets of the same type as the group displayed in operation 302, a determination is made (322) as to whether the second user has an associated second set of attributes selected for display. If the user does not have an associated second set (322—No), the first set of attributes is displayed (324) for assets in the respective group, wherein the first set does not include the deselected attribute. If the user has an associated second set (322—Yes), the second set of attributes is displayed (326) for assets in the respective group.

In a variant of the method 320, selection of an additional attribute for inclusion in the first set is detected (316). When the second user subsequently accesses the respective group of assets of the same type as the group displayed in operation 302, the determination is made (322) as to whether the second user has an associated second set of attributes selected for display. If the second user does not have an associated second set, the first set of attributes is displayed for assets in the respective groups, wherein the first set includes the additional attribute. If the user has an associated second set, the second set of attributes is displayed for assets in the respective group.

The method 320 thus allows users either to use default customized settings or to create personalized settings that override the default.

Figure 3C:
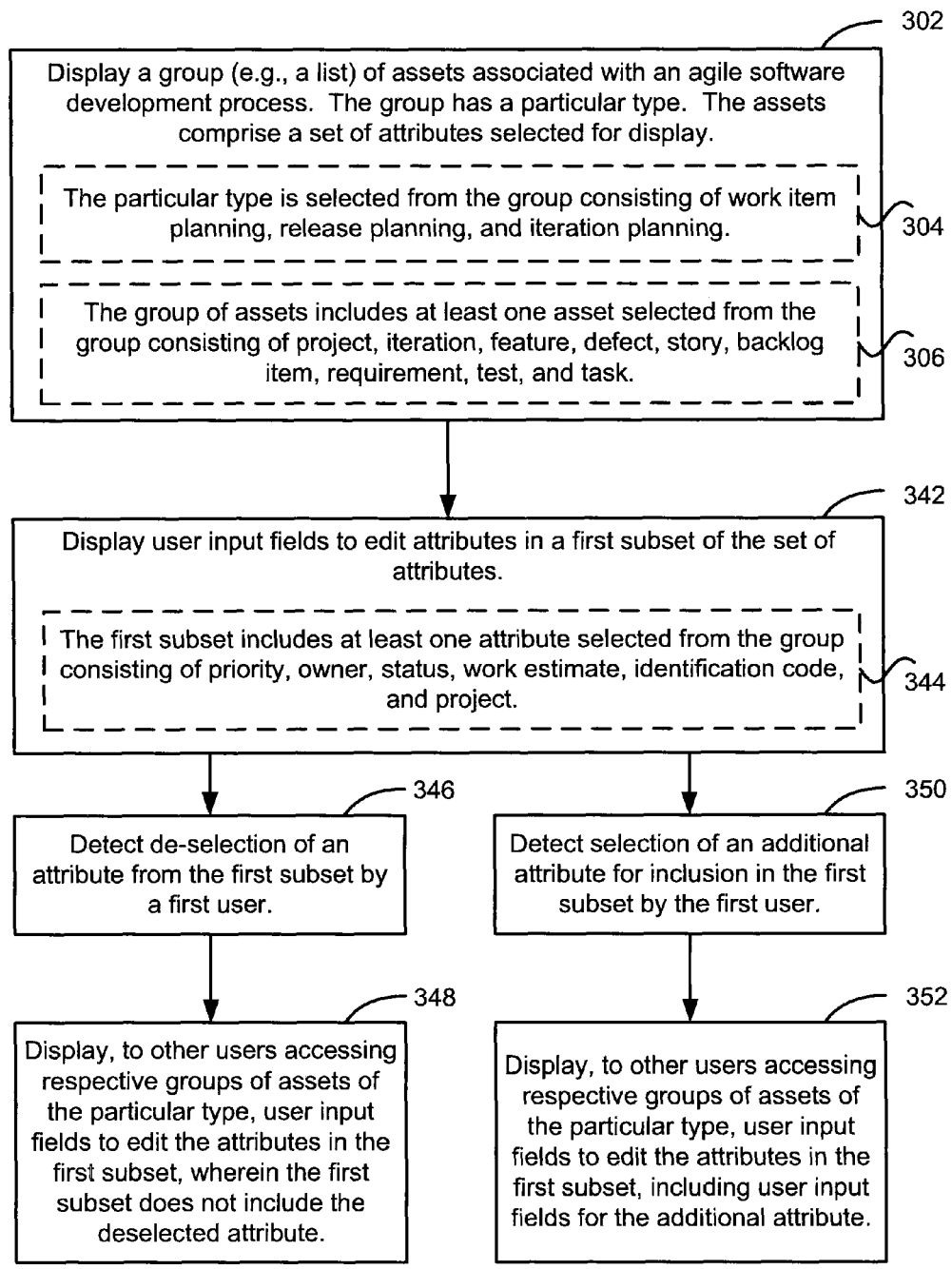

FIG. 3C is a flow diagram illustrating a method 340 for managing agile software development in accordance with some embodiments. In the method 340, a group of assets associated with an agile software development process is displayed (302). The group has a particular type and the assets include a first set of attributes selected for display. In some embodiments, the particular type is selected from the group consisting of work item planning, release planning, and iteration planning (304). In some embodiments, the group of assets includes at least one asset selected from the group consisting of project, iteration, feature, defect, story, backlog item, requirement, test, and task (306). Operations 302, 304, and 306 are described in more detail above with regard to method 300 (FIG. 3A).

User input fields to edit attributes in a first subset of the set of attributes are displayed (342). For example, user input fields (e.g., 228 and 230) corresponding to attributes "priority" 220 and "estimate" 230 are displayed in user interface 200 (FIG. 2A). In some embodiments, the first subset includes at least one attribute selected from the group consisting of priority, owner, status, work estimate, identification code, and project (344).

De-selection of an attribute from the first subset by a first user is detected (346). For example, clicking on the editing selection box 252 for the "priority" attribute 220 in the customization user interface 240 (FIG. 2B) would result in de-selection of the "priority" attribute 220 from the first subset.

For other users subsequently accessing respective groups of assets of the particular type, user input fields to edit the attributes in the first subset are displayed (348), wherein the first subset does not include the deselected attribute. For example, after de-selection of the "priority" attribute 220, a user accessing a "work item planning" group will not be shown a user input field for the "priority" attribute.

In addition to or instead of detecting de-selection of an attribute from the first subset, selection of an additional attribute by the first user for inclusion in the first subset is detected (350). For exampling, clicking on the editing selection box 250 for the "status" attribute 218 (FIG. 2B) would result in selection of the "status" attribute 218 for inclusion in the first subset.

For other users subsequently accessing respective groups of assets of the particular type, user input fields to edit the attributes in the first subset are displayed (352), including user input fields for the additional attribute. For example, after selection of the "status" attribute 218, a user accessing a "work item planning" group will be shown user input fields to edit the "status" attribute.

The method 340 thus enables creation of default customized settings, such as system defaults, to enable editing of specified attributes. While the method 340 includes a number of operations that appear to occur in a specific order, it should be apparent that the method 340 can include more or fewer operations, which can be executed serially or in parallel. An order of two or more operations may be changed and two or more operations may be combined into a single operation. For example, while operations 346-348 and 350-352 are shown as occurring in parallel, either operations 346-348 or 350-352 may be omitted. Alternately, operations 346 and 350 may both be performed prior to operations 348 and 352, which subsequently are performed in a single operation. Other variations are possible.

Figure 3D:
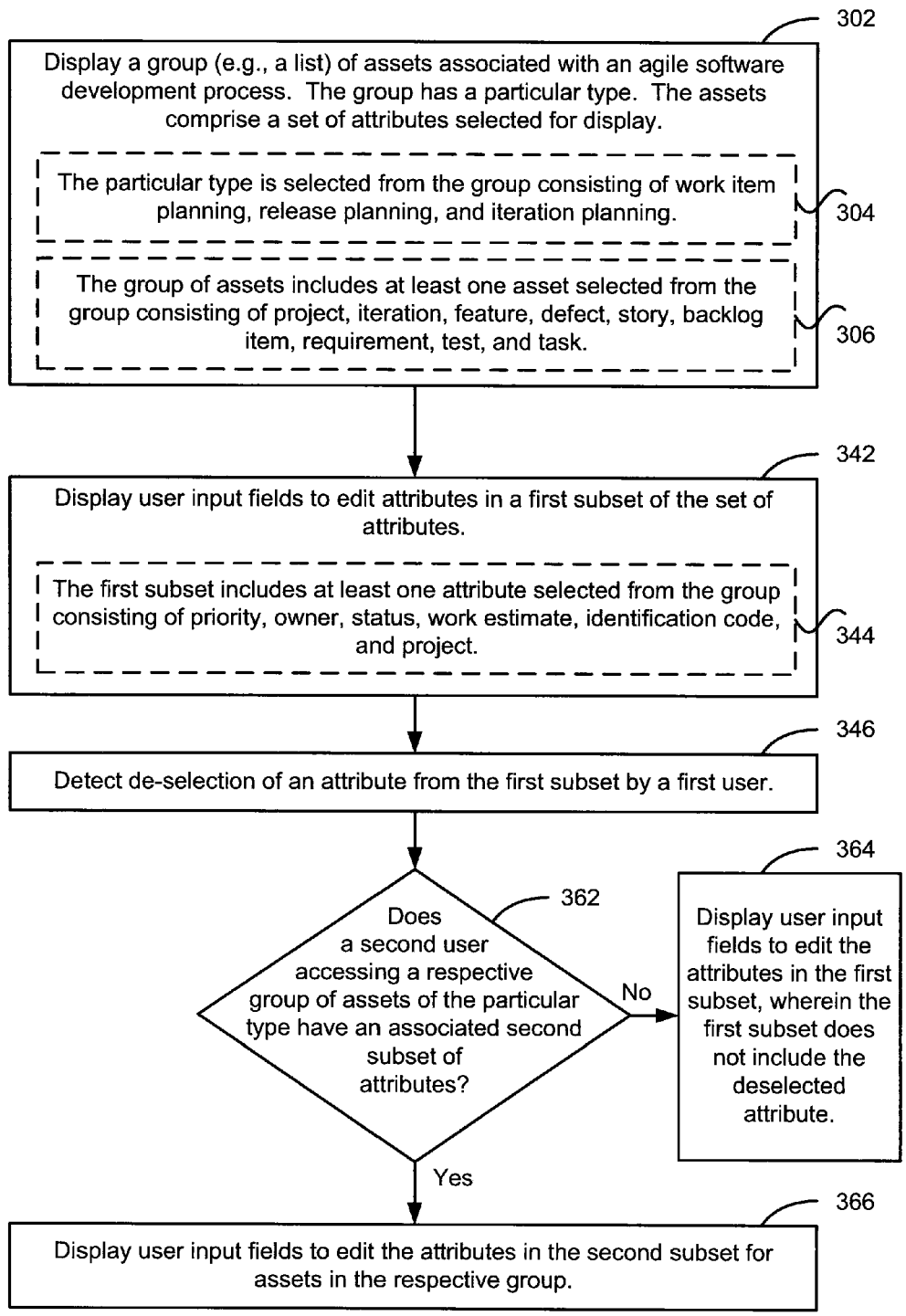

FIG. 3D is a flow diagram illustrating a method 360 for managing agile software development in accordance with some embodiments. In the method 360, operations 302-346 are performed as described above for method 340.

When a second user accesses a respective group of assets of the same type as the group displayed in operation 302, a determination is made (362) as to whether the second user has an associated second subset of attributes. If the second user does not have an associated second subset (362—No), user input fields are displayed (364) to edit the attributes in the first subset, wherein the first subset does not include the deselected attribute. If the second user has an associated second subset (362—Yes), user input fields are displayed (366) to edit the attributes in the second subset for assets in the respective group.

In a variant of the method 360, selection of an additional attribute by the first user for inclusion in the first subset is detected (350). When the second user subsequently accesses the respective group of assets of the same type as the group displayed in operation 302, the determination is made (362) as to whether the second user has an associated second subset of attributes. If the second user does not have an associated second subset, user input fields are displayed to edit the attributes in the first subset, including user input fields for the additional attribute. If the second user has an associated second subset, user input fields are displayed to edit the attributes in the second subset for assets in the respective group.

The method 360 thus enables editing of specified attributes in accordance with either default customized settings or personalized settings.

Figure 4:
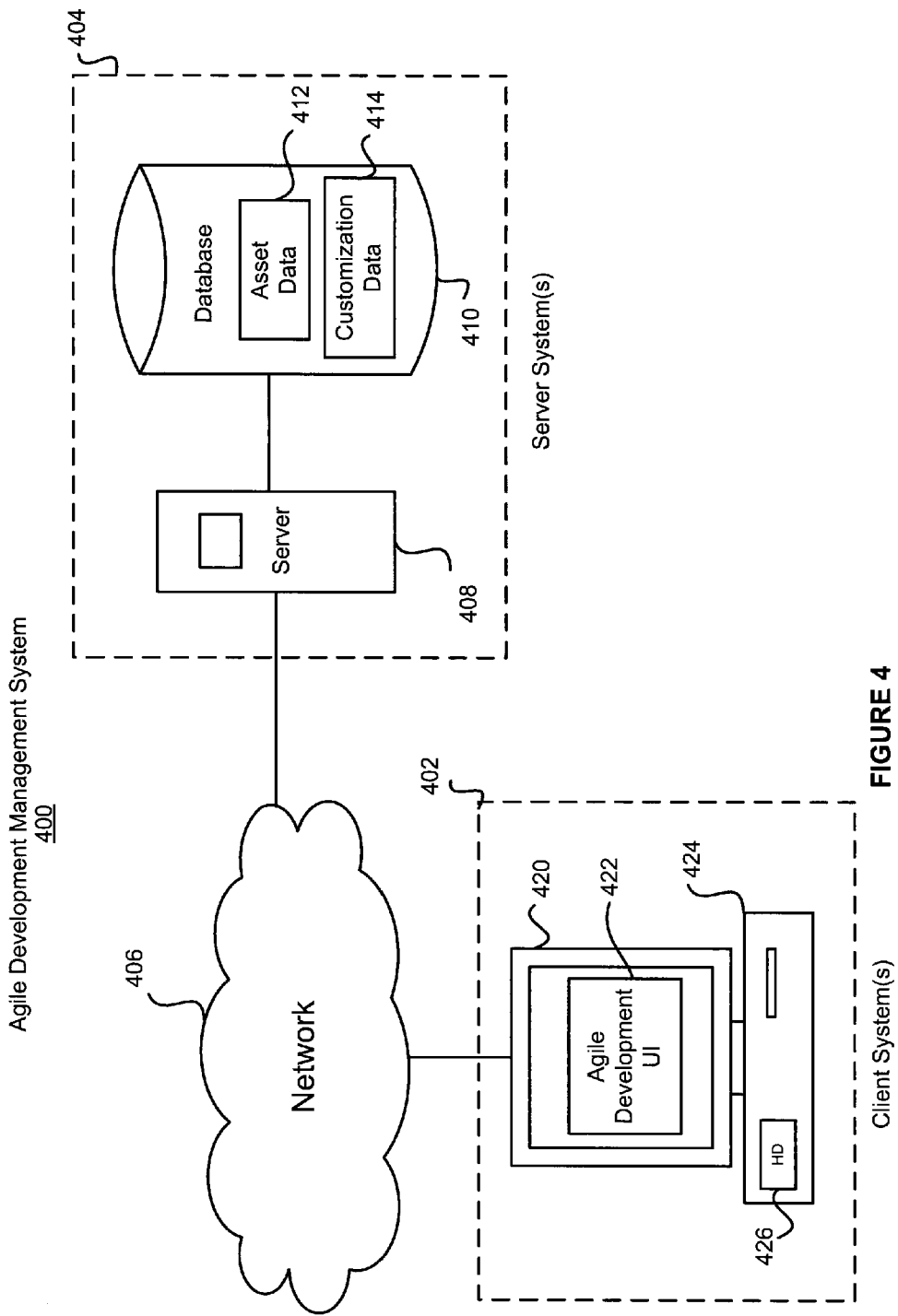
FIG. 4 is a block diagram illustrating an agile development management system in accordance with some embodiments.

FIG. 4 is a block diagram illustrating an agile development management system 400 in accordance with some embodiments. The agile development management system 400 includes a server system 404 coupled to one or more client systems 402 by a network 406. The client systems 402 may include client systems associated with respective users such as software developers, testers, managers, clients, customers, vendors, and any other parties involved in agile software development. The network 406 may be any suitable wired and/or wireless network and may include a local area network (LAN), wide area network (WAN), virtual private network (VPN), the Internet, metropolitan area network (MAN), or any combination of such networks.

The server system 404 includes a server 408 and a database 410. Server 408 serves as a front-end for the server system 404. Server 408, sometimes called a front end server, provides an interface between the server system 404 and the client systems 402. In some embodiments, the functions of server 408 may be divided or allocated among two or more servers.

Figure 7A:
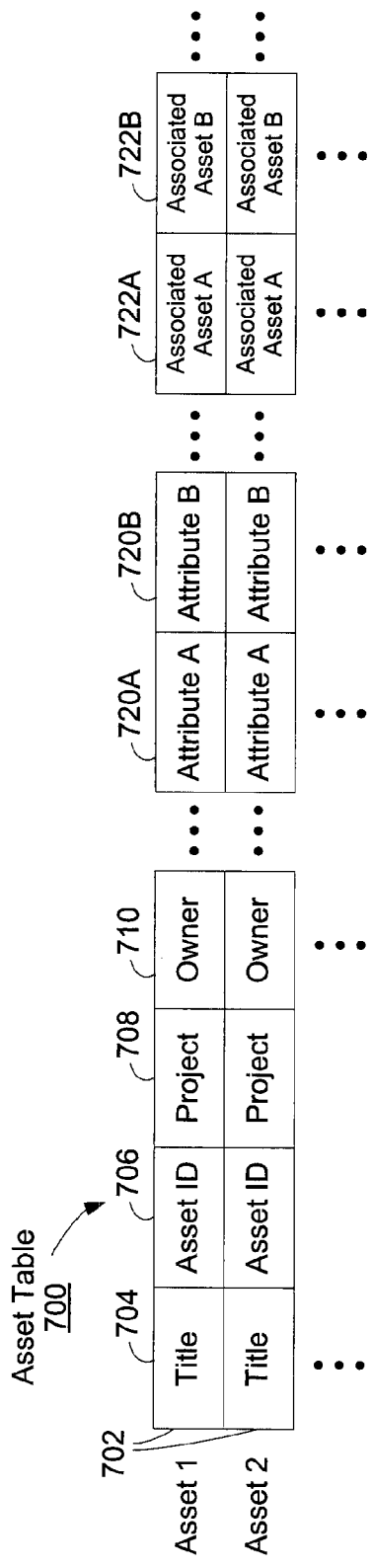
FIGS. 7A and 7B are diagrams illustrating data structures for assets and customized settings in accordance with some embodiments.
Figure 7B:
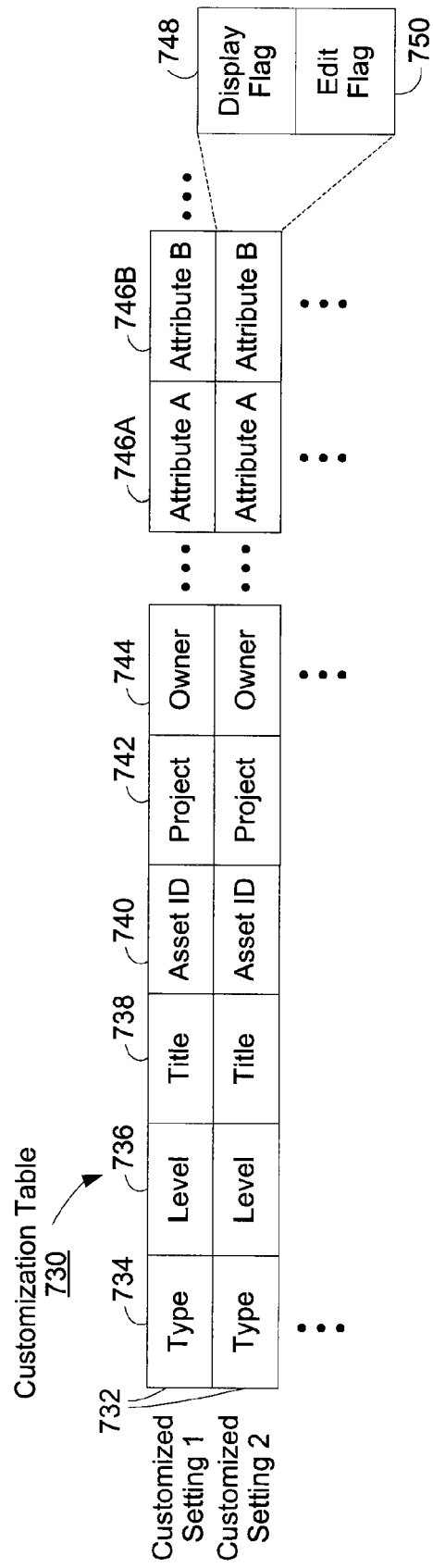

The server system 404 stores data relating to the agile development process, including asset data 412 and customization data 414. Asset data 412 includes attributes for respective assets. An exemplary data structure 700 for asset data 412 is illustrated in FIG. 7A, described below. Customization data 414 includes the level of the customization (e.g. system default or personalized), the type of asset group to which the customization applies, and data indicating which available assets are selected for display and for editing via user input fields. An exemplary data structure 730 for customization data 414 is illustrated in FIG. 7B, described below.

It should be appreciated that the server system 404, including the server 408 and the database 410, may be implemented as a distributed system of multiple computers. However, for convenience of explanation, the server system 404 is described herein as being implemented on a single computer, which can be considered a single logical system.

A user interfaces with the server system 404 at a client system or device 402 (hereinafter called the client system for ease of reference). The client system 402 includes a computer 424 or computer controlled device, such as a personal digital assistant (PDA), cellular telephone or the like. The computer 424 typically includes one or more processors (not shown); memory, which may include volatile memory (not shown) and non-volatile memory such as a hard disk drive 426; and a display 420. The computer 424 may also have input devices such as a keyboard and a mouse (not shown).

In some embodiments, a user may interact with the server system 404 via an agile development user interface 422 presented on the display 420. Examples of user interfaces 422 include user interface 200 (FIG. 2A) and customization user interface 240 (FIG. 2B). The user thus may interact with the server system to view or edit groups of assets (e.g., via user interface 200) and to create customized settings (e.g., according to methods 300, 320, 340, or 360).

In some embodiments, the agile development user interface 422 may be a web-based user interface. That is, the user interface 422 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 404. For example, the web page(s) may include a Javascript application that interfaces with the server system 404 via an application programming interface (API). The Javascript application receives asset data and customization data from the server system 404, manages the rendering of that data at the client, and also performs the client-side aspects of other tasks, such as marking attributes as selected or de-selected, updating attribute values according to data entered in user input fields, and transmitting user requests to the server system 404.

In some other embodiments, the agile development user interface 422 may be a part of a stand-alone application that is run on the client system 402. The standalone application may interface with the server system 404 via an application programming interface (API). Alternately, instead of using a client-sever model, the agile development management software may be installed and used on a single computer combining the functionalities of the server system 404 and client system 402.

Figure 5:
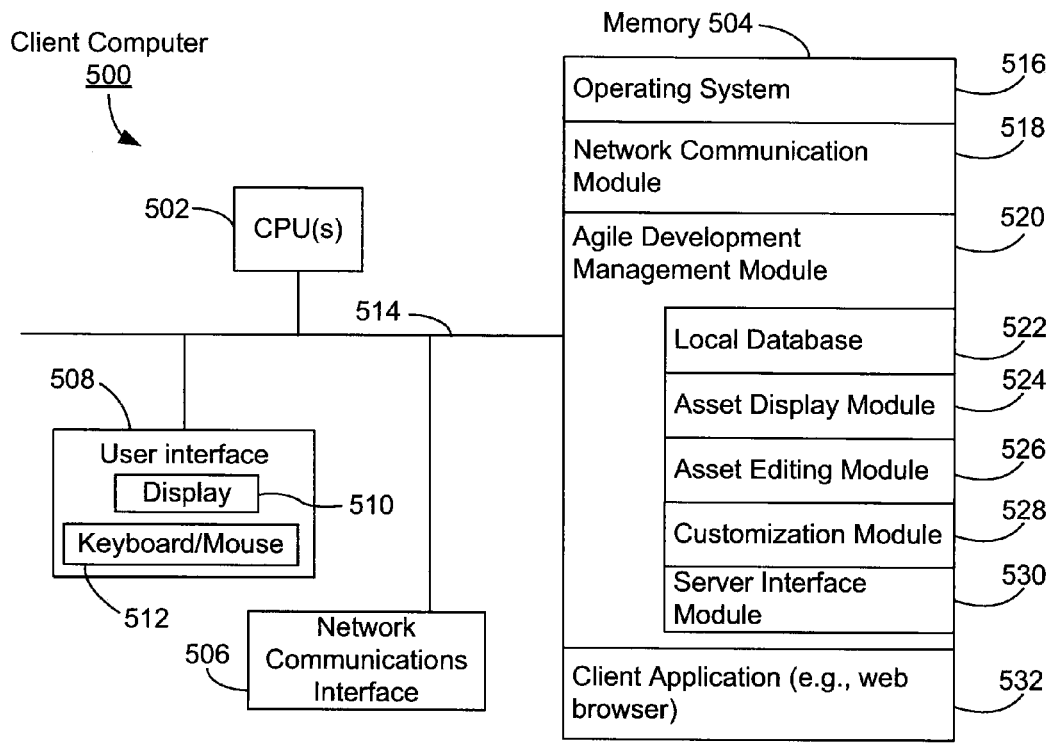
FIG. 5 is a block diagram illustrating a client computer in accordance with some embodiments.

FIG. 5 is a block diagram illustrating a client computer in accordance with some embodiments. The client computer 500, which may be used as a client system 402 (FIG. 4), typically includes one or more processing units (CPUs) 502, one or more network or other communications interfaces 506, memory 504, and one or more communication buses 514 for interconnecting these components. The communication buses 514 may include circuitry (sometimes called a chipset) that interconnects and controls communications between system components. The client computer 500 may also include a user interface 508 comprising a display device 510 and a keyboard and/or mouse (or other pointing device) 512. Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. In some embodiments, memory 504 stores the following programs, modules and data structures, or a subset thereof:
- an operating system 516 that includes procedures for handling various basic system services and for performing hardware dependent tasks;
- a network communication module 518 that is used for connecting the client system 500 to other computers via the one or more communication network interfaces 506 and one or more communication networks, such as the Internet, other wide area networks, local area networks, metropolitan area networks, and so on;
- an agile development management module 520 for handling data relating to the agile development process; and
- a client application 532, such as a web browser.

In some embodiments, the agile development management module 520 includes a local database 522 for storing data sent by the server (e.g., asset data and customization data), an asset display module 524 for displaying groups of assets (e.g., via user interface 200, FIG. 2A), an asset editing module for updating attribute values (e.g., in accordance with data entered via user input fields), a customization module for enabling creation of customized settings (e.g., via customization user interface 240, FIG. 2B), and a server interface module 530 for interfacing with server computer 500. In some embodiments, the server interface module 530 includes a cache for storing data to be transmitted to the server.

In some embodiments, the agile development management module 520 may be a script-based module, embedded in a web page served from the server system 404 (FIG. 4). The web page may be rendered by a client application 532, such as a web browser, at the client computer 500. When the web page is rendered, the agile development management module 520 is executed, thereby providing a web-based interface to the server system 404. The script-based agile development management module may be written in JavaScript, AJAX, ECMAScript, Perl, or any other suitable scripting language.

In some other embodiments, the agile development management module 520 may be a standalone application stored in memory 504 of the client computer 500.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Figure 6:
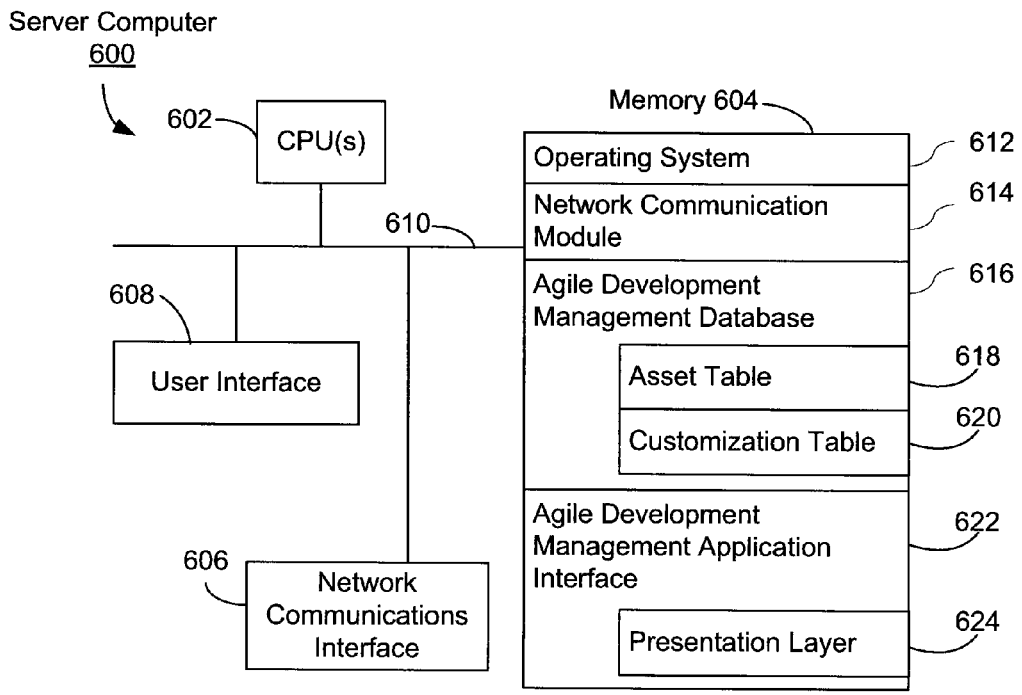
FIG. 6 is a block diagram illustrating a server computer in accordance with some embodiments.

FIG. 6 is a block diagram illustrating a server computer 600 in accordance with some embodiments. The server computer 600, which may be used as a server system 404 (FIG. 4), typically includes one or more processing units (CPUs) 602, one or more network or other communications interfaces 606, memory 604, and one or more communication buses 610 for interconnecting these components. The communication buses 610 may include circuitry (sometimes called a chipset) that interconnects and controls communications between system components. The server system 600 optionally may include a user interface 608, which may include a display device (not shown), and a keyboard and/or a mouse (not shown). Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. In some embodiments, memory 604 stores the following programs, modules and data structures, or a subset thereof:
- an operating system 612 that includes procedures for handling various basic system services and for performing hardware dependent tasks;

a network communication module 614 that is used for connecting the server system 600 to other computers via the one or more communication network interfaces 606 and one or more communication networks, such as the Internet, other wide area networks, local area networks, metropolitan area networks, and so on;

an agile development management database 616 for storing data relating to the agile development process, including a asset data 618 and customization data 620; and an agile development management application interface 622 for exchanging information with the agile development management modules 520 in one or more client computers 500.

In some embodiments, the application interface 622 includes a presentation layer 624 for rendering user interfaces (e.g., UI 200, FIG. 2A, and UI 240, FIG. 2B) accessed by a client system 402.

In some embodiments, the customization data 620 includes three levels of customization settings used by the presentation layer 624 to render user interfaces. A base level includes settings that are always included in the agile development management software. An installation level includes settings that are created for a particular installation of the agile development management software. For example, the installation level may include customization settings created via user interface 240. A user level includes personalized settings. Additional levels are possible, such as levels corresponding to a particular project hierarchy node (e.g., to a particular team). In some embodiments, settings at a given level override settings at lower levels. For example, installation settings override base settings, and user settings override both installation and base settings. In some embodiments, the presentation layer 624 first applies base-level settings, then overlays any installation-level overrides, and finally overlays any user-level overrides.

Each of the above identified elements in FIG. 6 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 604 may store a subset of the modules and data structures identified above. Furthermore, memory 604 may store additional modules and data structures not described above.

Although FIG. 6 shows a "server computer," FIG. 6 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers.

The agile development management database 616 stores data in various tables. For example, an "Asset Type" table includes an entry for each kind of asset, such as feature, defect, task, or test. An "Attribute Definition" table defines the attributes associated with each kind of asset listed in the "Asset Type" table. A "Synthetic Attribute" table references formulas used to calculate synthetic attributes. An "Attribute Security Check" table contains references to operations used to determine whether a user may access or modify particular attributes. For attributes that are associated assets, a "Relation Definition" table defines relationships between assets. In addition, a "Many to Many Relation Definition" table may contain relationship information for assets in many-to-many relationship with other assets. Other tables may specify business rules for various assets.

Attribute values for particular assets are stored in asset tables 700, as illustrated in FIG. 7A in accordance with some embodiments. In some embodiments, a table 700 corresponds to a particular kind of asset, such as feature, defect, task, or test. The asset table 700 includes a row 702 for each respective asset stored in the table. Each row includes fields that contain values for attributes of the respective asset, as defined in the "Attribute Definition" table. For example, the attribute fields include title 704, asset ID 706, project 708, owner 710, and various other attributes 720. Other possible attribute fields include, without limitation, the attributes listed in group 242 (FIG. 2B), such as status, priority, estimate, and attachment counts. The asset table 700 also includes fields 722 to specify attributes that are associated assets. For example, if a respective asset is a feature or defect, fields 722 may specify tasks and tests associated with the feature or defect, for example by providing the asset IDs of the tasks and tests. In another example, a field 722 may specify an iteration to which an asset is assigned.

In some embodiments, values for user-defined customized attributes are stored in separate tables for specific types of custom attributes. For example, numeric customized attributes are stored in a first table, text customized attributes are stored in a second table, boolean customized attributes are stored in a third table, and so on.

Customization data 620, such as the three levels of settings used by the presentation layer 624, also may be stored in tables in the database 616. FIG. 7B is a diagram illustrating a customization table 730 for customized settings in accordance with some embodiments. Each row 732 in the table 730 corresponds to a customized setting. Each row 732 includes a field 734 that specifies the type of asset group, such as work item planning, release planning, or iteration planning, to which the customized setting applies. Each row also includes a field 736 specifying the level of the customized setting, such as system default or personalized setting. In addition, each row includes fields corresponding to available attributes, such as title 738, asset ID 740, project 742, owner 744, and various other attributes 746. In some embodiments, a field corresponding to an available attribute includes a display flag 748 and an edit flag 750. The display flag 748 indicates whether the attribute is selected for display. The edit flag 750 indicates whether to display user input fields to permit editing of the attribute.

Tables 700 and 730 thus include information to allow the agile development management application interface 622 to respond to a request from a client computer 500 when a user seeks to display an asset group of a particular type. The interface 622 can query asset tables 700 to identify the assets in the group and can query the customization table 730 to determine which customized setting, if any, applies.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of managing agile software development, comprising:
   displaying a group of software assets associated with an agile software development process, the group having a particular type;
   displaying (i) a first set of attributes associated with the group of software assets, wherein the first set of attributes includes at least one of asset owner, asset status, asset priority, asset estimate, asset build, asset dependency, and asset change date, and
      (ii) a first set of values corresponding to the first set of attributes;
   in response to detecting a request by a first user having a first privilege type,
      displaying a group of available attributes including the first set;
   after the group of available attributes is displayed:
      detecting a de-selection of an attribute from the first set by the first user, wherein the de-selection causes the attribute to be inaccessible to one or more other users; and
   after detecting the de-selection of the attribute from the first set:
      receiving, from a second user having a second privilege type, a request for accessing attributes associated with the group of software assets;
      in response to receiving the request from the second user:
         (i) in accordance with a determination that the second privilege type enables the second user to access a second set of attributes associated with the group of software assets, wherein the second set of attributes includes at least one attribute distinct from attributes in the first set of attributes:
            without regard to the de-selection by the first user, displaying, to the second user, the second set of attributes in place of the first set of attributes; and
         (ii) in accordance with a determination that the second privilege type does not enable the second user to access the de-selected attribute in the first set of attributes:
            hiding, without human intervention, from display, to the second user,
               (i) the de-selected attribute, and
               (ii) a value corresponding to the de-selected attribute.

2. The method of claim 1, further comprising:
   detecting a selection of an additional attribute for inclusion in the first set of attributes, and
   in response to the selection of the additional attribute:
      displaying to a plurality of other users,
         (i) the additional attribute, and
         (ii) a value corresponding to the additional attribute.

3. The method of claim 1, wherein the group of assets is a list of assets.

4. The method of claim 1, wherein the group of software assets includes one or more software features and one or more software defects.

5. The method of claim 1, wherein the group of software assets includes at least one asset selected from the group consisting of project, iteration, feature, defect, story, backlog item, requirement, test, and task.

6. The method of claim 1, wherein a value of a displayed attribute is blank.

7. The method of claim 1, wherein the available attributes include at least one attribute selected from the group consisting of priority, owner, status, work estimate, identification code, and project.

8. The method of claim 1, wherein the particular type is selected from the group consisting of work item planning, release planning, and iteration planning.

9. The method of claim 1, wherein the first user is a system administrator.

10. A system for managing agile software development, comprising:
    memory;
    a display;
    one or more processors; and
    one or more programs stored in the memory and configured for execution by the one or more processors, the one or more programs including instructions to:
       display a group of software assets associated with an agile software development process, the group having a particular type;
       display (i) a first set of attributes associated with the group of software assets, wherein the first set of attributes includes at least one of asset owner, asset status, asset priority, asset estimate, asset build, asset dependency, and asset change date, and
          (ii) a first set of values corresponding to the first set of attributes;
       display a group of available attributes including the first set, in response to detecting a request by a first user having a first privilege type;
       detect, after the group of available attributes is displayed, a de-selection of an attribute from the first set by the first user, wherein the de-selection causes the attribute to be inaccessible to one or more other users; and
       after detecting the de-selection of the attribute from the first set:
          receive from a second user having a second privilege type, a request for accessing attributes associated with the group of software assets;
          in response to receiving the request from the second user:
             (i) in accordance with a determination that the second privilege type enables the second user to access a second set of attributes associated with the group of software assets, wherein the second set of attributes includes at least one attribute distinct from attributes in the first set of attributes:
                without regard to the de-selection by the first user, display, to the second user, the second set of attributes in place of the first set of attributes; and
             (ii) in accordance with a determination that the second privilege type does not enable the second user to access the de-selected attribute in the first set of attributes:
                hide without human intervention, from display, to the second user,
                   i) the de-selected attribute, and
                   ii) a value corresponding to the de-selected attribute.

11. A non-transitory computer readable storage medium storing one or more programs for use in managing agile software development, the one or more programs comprising instructions to:

display a group of software assets associated with an agile software development process, the group having a particular type;

display (i) a first set of attributes associated with the group of software assets, wherein the first set of attributes includes at least one of: asset owner, asset status, asset priority, asset estimate, asset build, asset dependency, and asset change date, and
   (ii) a first set of values corresponding to the first set of attributes;

display a group of available attributes including the first set, in response to detecting a request by a first user having a first privilege type;

detect, after the group of available attributes is displayed, a de-selection of an attribute from the first set by the first user, wherein the de-selection causes the attribute to be inaccessible to one or more other users; and after detecting the de-selection of the attribute from the first set:
   receive from a second user having a second privilege type, a request for accessing attributes associated with the group of software assets;
   in response to receiving the request from the second user:
      (i) in accordance with a determination that the second privilege type enables the second user to access a second set of attributes associated with the group of software assets, wherein the second set of attributes includes at least one attribute distinct from attributes in the first set of attributes:
         without regard to the de-selection by the first user, display, to the second user, the second set of attributes in place of the first set of attributes; and
      (ii) in accordance with a determination that the second privilege type does not enable the second user to access the de-selected attribute in the first set of attributes:
         hide without human intervention, from display, to the second user,
            i) the de-selected attribute, and
            ii) a value corresponding to the de-selected attribute.

12. A computer-implemented method of managing agile software development, comprising:
   displaying a group of software assets associated with an agile software development process, the group having a particular type;
   displaying (i) a first set of attributes associated with the group of software assets, wherein the first set of attributes includes at least one of: asset owner, asset status, asset priority, asset estimate, asset build, asset dependency, and asset change date, and
      (ii) a first set of user input fields corresponding to the set of attributes;
   in response to detecting a request by a first user having a first privilege type,
      displaying a group of available attributes including the first set;
   after the group of available attributes is displayed:
      detecting a de-selection of an attribute from the first set of attributes by the first user; and
   after detecting the de-selection of the attribute from the first set:
      receiving, from a second user having a second privilege type, a request for accessing attributes associated with the group of software assets;
      in response to receiving the request from the second user:
         (i) in accordance with a determination that the second privilege type enables the second user to access a second set of attributes associated with the group of software assets, wherein the second set of attributes includes at least one attribute distinct from attributes in the first set of attributes:
            without regard to the de-selection by the first user, displaying, to the second user, the second set of attributes in place of the first set of attributes; and
         (ii) in accordance with a determination that the second privilege type does not enable the second user to access the de-selected attribute in the first set of attributes:
            (i) the de-selected attribute, and
            (ii) a user input field corresponding to the de-selected attribute.

13. The method of claim 12, further comprising:
detecting a selection of an additional attribute for inclusion in the first set of attributes by the first user, and
in response to the selection of the additional attribute, displaying to a plurality of other users:
   (i) the additional attribute, and
   (ii) a user input field corresponding to the additional attribute.

14. The method of claim 12, wherein the group of software assets is a list of assets.

15. The method of claim 12, wherein the group of software assets includes one or more software features and one or more software defects.

16. The method of claim 12, wherein the group of assets includes at least one asset selected from the group consisting of project, iteration, feature, defect, story, backlog item, requirement, test, and task.

17. The method of claim 12, wherein a value of a displayed attribute is blank.

18. The method of claim 12, wherein the set of attributes includes at least one attribute selected from the group consisting of priority, owner, status, work estimate, identification code, and project.

19. The method of claim 12, wherein the particular type is selected from the group consisting of work item planning, release planning, and iteration planning.

20. The method of claim 12, wherein the first user is a system administrator.

* * * * *

UNITED STATES PATENT AND TRADEMARK OFFICE
CERTIFICATE OF CORRECTION

PATENT NO. : 8,701,078 B1
APPLICATION NO. : 12/245566
DATED : April 15, 2014
INVENTOR(S) : Holler et al.

Page 1 of 1

It is certified that error appears in the above-identified patent and that said Letters Patent is hereby corrected as shown below:

In the Claims

Claim 1, col. 15, line 11, please delete "one of asset" and insert --one of: asset--; and Claim 10, col. 16, line 23, please delete "one of asset" and insert --one of: asset--.

Signed and Sealed this
Twenty-second Day of July, 2014

Michelle K. Lee
*Deputy Director of the United States Patent and Trademark Office*